324 ...
CROSS REFERENCE SEARCH ROOM

June 9, 1964 A. T. STARR 3,136,988

CODE CONVERTING ARRANGEMENTS FOR PULSE CODE MODULATION SYSTEMS

Filed March 20, 1959 3 Sheets-Sheet 1

Inventor
A. T. Starr
By [signature]
Attorney

CODE CONVERTING ARRANGEMENTS FOR PULSE CODE MODULATION SYSTEMS
Filed March 20, 1959
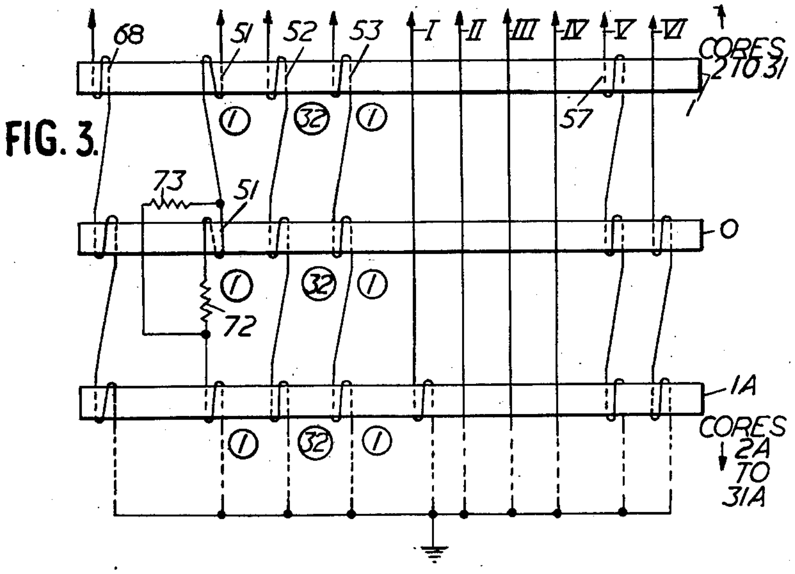
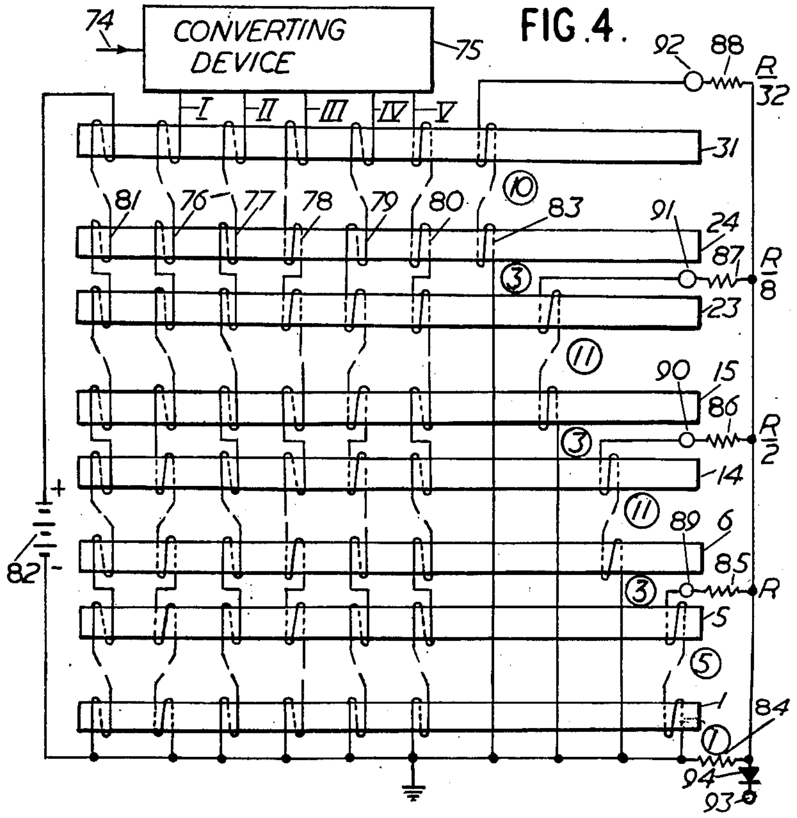
Inventor
A. T. Starr
By R P Morris
Attorney June 9, 1964 A. T. STARR 3,136,988

CODE CONVERTING ARRANGEMENTS FOR PULSE CODE MODULATION SYSTEMS

Filed March 20, 1959 3 Sheets-Sheet 3

Inventor
A. T. Starr
By R P Morris.
Attorney 3,136,988

CODE CONVERTING ARRANGEMENTS FOR PULSE CODE MODULATION SYSTEMS

Arthur Tisso Starr, Aldwych, London, England, assignor to International Standard Electric Corporation, New York, N.Y., a corporation of Delaware Filed Mar. 20, 1959, Ser. No. 800,708
Claims priority, application Great Britain Mar. 27, 1958
10 Claims. (Cl. 340—347)

The present invention relates to code converting arrangements for electric pulse modulation systems.

The invention consists in an improvement in, or modification of, the invention described and claimed in U.S. Patent 2,954,550, issued September 27, 1960, and assigned to the same assignee as is the present application, which for convenience will be called the "parent specification." In the arrangements described in the parent specification, two-condition trigger devices comprising magnetic material having a substantially rectangular hysteresis characteristic are used to form various coding arrangements for converting samples of a signal wave into groups of digit pulses according to some form of the binary code.

The present invention covers a number of other arrangements based on the same principles, including circuits for coding and decoding which provide for amplitude compression and expansion; and code translating circuits.

The invention will be described with reference to the accompanying drawings, in which:

FIG. 3 shows a modification of part of FIG. 1 used to explain an alternative form of the coding circuit;

FIG. 4 shows an example of a circuit for decoding the code combinations produced by the circuit of FIG. 1, with the introduction of complementary amplitude expansion;

FIG. 1 shows one example of a coding circuit according to the invention in which amplitude compression is introduced as part of the coding process. It will be assumed for illustration that a five-digit binary code will be used, which provides for 32 amplitude levels.

FIG. 1 is drawn on similar lines to FIG. 1 of the parent specification, and employs 31 cores, since no core is required for zero level, which corresponds to the absence of all digit pulses.

These cores are of a magnetic material having a substantially rectangular hysteresis loop, such as ferrite material, as explained in the parent specification.

Figure 1:
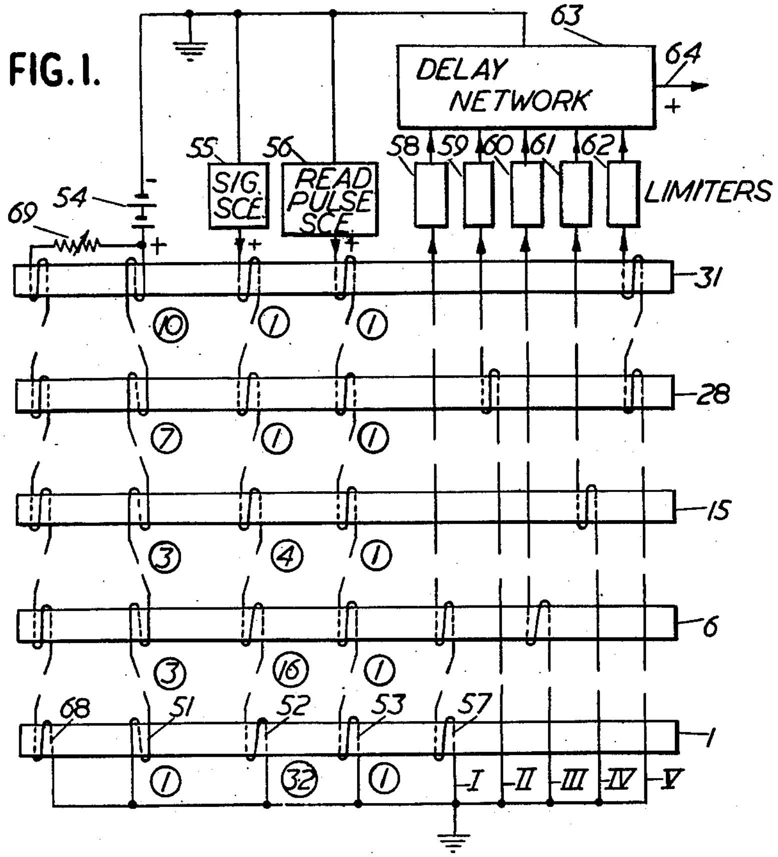
FIG. 1 shows an example of a coding circuit according to the invention which provides for amplitude compression.

FIG. 1, however, only shows five of the cores, namely those corresponding to levels 1, 6, 15, 28 and 31, and these cores are correspondingly numbered. Corresponding windings of all the cores, including those not shown, are connected in series, and the conductors between the cores are interrupted to indicate that they include windings on cores not shown.

On each core is wound a bias winding 51, a signal winding 52, and a reading pulse winding 53, as designated on core No. 1, and also one or more digit pulse windings which will be described later. The windings 52 and 53 on all the cores are wound in the same direction, but the bias windings 51 are all wound in the opposite direction. A direct-current bias source 54 having its negative terminal connected to ground supplies bias current to all the bias windings in series, the current flowing downwards from core 31 to core 1 as shown. A source 55 supplies a signal wave to be coded to all the signal windings 52 in series, and it will be assumed that the signal wave voltage varies between zero and some maximum positive voltage V. A source 56 supplies short positive reading or sampling pulses to all the reading pulse windings 53 in series. These reading pulses should have a repetition frequency at least equal to twice the highest significant frequency component in the signal wave.

All the windings are shown for clearness as single-turn windings, but they will actually have various numbers of turns, as will be explained later.

The arrangement is designed to operate in such manner that when the signal wave amplitude level is equal to or greater than the $m^{th}$ quantising level but is less than the $(m+1)^{th}$ quantising level, a change of flux is produced only in the $m^{th}$ core when a reading pulse appears. This will induce output digit pulses in any digit windings there may be on the $m^{th}$ core. Accordingly, each of the 31 cores is provided with one or more digit windings 57 connected in series with one or more of five digit output conductors connected respectively to five similar amplitude limiters 58 to 62 corresponding respectively to digits 1 to 5 of the code. These digit conductors are designated I to V in Roman numerals. In response to each reading pulse there will be delivered to each of one or more of the five output conductors from the limiters a digit pulse, according to the code. It will be clear that each of the 31 cores is supplied with a set of digit windings according to the pattern of the selected form of the binary code. Preferably, the code to be chosen is the cyclic permutation code.

Should it be desired that the digit pulses be supplied in sequence to a single conductor instead of simultaneously to separate conductors, the limiters 58 to 62 may be connected to appropriate tapping points of a delay network 63, so that the digit pulses are delivered in sequence to the output conductor 64 in known manner.

If the digit windings 57 are all wound in the same direction as the signal and reading pulse windings, then positive digit pulses will be obtained at the outputs of the limiters 58 to 62, or on conductor 64.

In order to introduce amplitude compression in the arrangement of FIG. 1, the quantising steps are made to increase with increasing signal amplitude, so that the step between levels 30 and 31 is a relatively large multiple of the step between levels 0 and 1. It will be assumed, for example, that this multiple is equal to 32 (though this multiple has no necessary connection with the number of levels which can be represented by the code). It is impracticable to arrange for the quantising steps to increase smoothly with increase in signal amplitude, so a compromise is adopted in which the quantising steps are divided into four or five groups, the steps being equal in each group, but being greater in successive groups. This grading of the quantising steps is achieved by suitably choosing the numbers of turns of the signal and bias windings 51 and 52 of the 31 cores, the reading pulse windings having all the same number of turns, for example, 1 turn.

The choice of the numbers of turns is set out in the following Table I for each of the 31 cores. A positive sign indicates that the winding is wound "straight," that is in the direction indicated in FIG. 1 for the windings 52, and a negative sign indicates that the winding is wound "reverse." The dstribution of the digit windings on the cores for the cyclic permutation code is also shown in Table I. These windings may have any desired number of turns so long as it is the same for all, and the presence of such a winding is indicated in Table I by a + sign.

*Table I*

| Core No. | No. of Turns for Winding No. | | | Digit Windings | | | | |
|---|---|---|---|---|---|---|---|---|
| | 52 | 53 | 51 | 1 | 2 | 3 | 4 | 5 |
| 1 | +32 | +1 | −1 | + | ------ | ------ | ------ | ------ |
| 2 | +32 | +1 | −2 | + | + | ------ | ------ | ------ |
| 3 | +32 | +1 | −3 | ------ | + | ------ | ------ | ------ |
| 4 | +32 | +1 | −4 | ------ | + | + | ------ | ------ |
| 5 | +32 | +1 | −5 | + | + | + | ------ | ------ |
| 6 | +16 | +1 | −3 | + | ------ | + | ------ | ------ |
| 7 | +16 | +1 | −4 | ------ | ------ | + | ------ | ------ |
| 8 | +16 | +1 | −5 | ------ | ------ | + | + | ------ |
| 9 | +16 | +1 | −6 | + | ------ | + | + | ------ |
| 10 | +16 | +1 | −7 | + | + | + | + | ------ |
| 11 | +16 | +1 | −8 | ------ | + | + | + | ------ |
| 12 | +16 | +1 | −9 | ------ | + | ------ | + | ------ |
| 13 | +16 | +1 | −10 | + | + | ------ | + | ------ |
| 14 | +16 | +1 | −11 | + | ------ | ------ | + | ------ |
| 15 | +4 | +1 | −3 | ------ | ------ | ------ | + | ------ |
| 16 | +4 | +1 | −4 | ------ | ------ | ------ | + | + |
| 17 | +4 | +1 | −5 | + | ------ | ------ | + | + |
| 18 | +4 | +1 | −6 | + | + | ------ | + | + |
| 19 | +4 | +1 | −7 | ------ | + | ------ | + | + |
| 20 | +4 | +1 | −8 | ------ | + | + | + | + |
| 21 | +4 | +1 | −9 | + | + | + | + | + |
| 22 | +4 | +1 | −10 | + | ------ | + | + | + |
| 23 | +4 | +1 | −11 | ------ | ------ | + | + | + |
| 24 | +1 | +1 | −3 | ------ | ------ | + | ------ | + |
| 25 | +1 | +1 | −4 | + | ------ | + | ------ | + |
| 26 | +1 | +1 | −5 | + | + | + | ------ | + |
| 27 | +1 | +1 | −6 | ------ | + | + | ------ | + |
| 28 | +1 | +1 | −7 | ------ | + | ------ | ------ | + |
| 29 | +1 | +1 | −8 | + | + | ------ | ------ | + |
| 30 | +1 | +1 | −9 | + | ------ | ------ | ------ | + |
| 31 | +1 | +1 | −10 | ------ | ------ | ------ | ------ | + |

An explanation of Table I will now be given. Let S be the flux produced in any core by the signal wave flowing in one turn of the signal winding 52, and let B be the flux produced in any core by the bias current flowing in one turn of the bias winding 51. Then for any given core in which the signal winding has $s$ turns, and the bias winding has $b$ turns, a reading pulse will produce an output pulse in a digit winding of the given core when $sS=bB$. Now let $v$ be the signal voltage which is just sufficient to produce a digit pulse from core No. 1. The quantising step from level 0 to level 1 is thus equal to $v$. Since the number $b$ of bias turns on cores 1 to 5 increases in unit steps from 1 to 5, it will be evident that levels 1 to 5 correspond to signal voltages of $v$ to $5v$ respectively. In the case of core No. 6, the number $s$ of signal winding turns is halved from 32 to 16, and $b$ is changed from 5 to $3=6/2$. Thus the quantising step from level 5 to level 6 is again the same as before, namely $v$. However, for cores 7 to 14 $s$ is now 16 instead of 32, and $b$ increases in unit steps as before, so that the quantising step is now $2v$. When core No. 15 is reached, $s$ is reduced to 4 and $b$ to $12/4=3$ so that the quantising step between levels 14 and 15 is again $2v$. On the same principles it will be clear from Table I that the quantising steps from levels 15 to 24 are equal to $8v$, and the remainder are equal to $32v$. Thus the total amplitude range from level 0 to level 31 will be equal to $$6v+9(2v)+9(8v)+7(32v)=320v$$

Since with no compression the amplitude range between level 0 and level 31 would be $31v$, it follows that the compression introduced is equivalent to $20 \log_{10} (320/31)$ decibels=about 20 decibels.

In FIG. 1, the numbers of turns given in Table I for the windings on those cores which are shown, are indicated in small circles.

It will be understood that it is not essential to use the particular numbers of turns given in Table I. For example, the reading pulse windings 53 could have more than one turn (depending on the amplitude of the reading pulses) so long as they all have the same number. Secondly, the numbers of turns for the windings 51 and 52 could be multiplied by the same or different integers, so long as the same multiplier is used for all the cores in the case of each type of winding.

It is clearly also possible to vary the compression pattern. Thus, for example, the windings 52 on cores 11 to 16 could be provided with 8 turns, the corresponding bias windings 51 having 4 to 9 turns respectively.

For simplicity it has been assumed above that the core material has only two conditions of magnetisation with an infinitely steep transition between them. In other words it is assumed that the coercive force is zero and that the change between the two conditions at the transition point is produced by a negligible change in the applied magnetic field. In practice, of course, the core material has a nearly, but not quite, rectangular hysteresis characteristic with an appreciable width such as that shown in FIG. 2, in which the fluxes B are plotted as ordinates against the corresponding applied magnetic fields H as abscissae.

If the core be supposed to have been saturated by a large negative field which is afterwards removed, it will be left in the condition represented by the point 65. Let $H_c$ be the applied coercive field necessary to shift the condition of the core to the point 66, and left $h$ be the additional field necessary to shift the condition to the point 67. Then with suitable core material, $h$ is smaller than $H_c$.

In order to operate the cores in the manner described above, it is preferable to apply to each of the cores an auxiliary positive bias field equal to $H_c$ so that in the absence of any other applied field the core is in the condition represented by the point 66. This may be done, for example by supplying each core with an auxiliary bias winding designated 68 for core 1 in FIG. 1, consisting, for example, of one turn, and wound "straight" on all cores, that is, in the same direction as the reading pulse winding 53. The windings 68 of all the cores are connected in series to the source 54 through a resistor 69 which is adjusted so that the magnetic field applied to each core is $H_c$.

Alternatively, the auxiliary bias current could be supplied to the reading pulse windings 53 by suitably biassing the reading pulse source 56.

It will thus be seen that the current in the bias windings 51 biasses each core in the negative direction from the point 66. The bias field $H_b$ corresponding to the quantum level difference $v$ should be large compared with $h$. When the flux due to the signal wave is just equal to the flux due to the bias current in the winding 51 of one of the cores, the condition of the core is back to the condition represented by the point 66.

Figure 2:
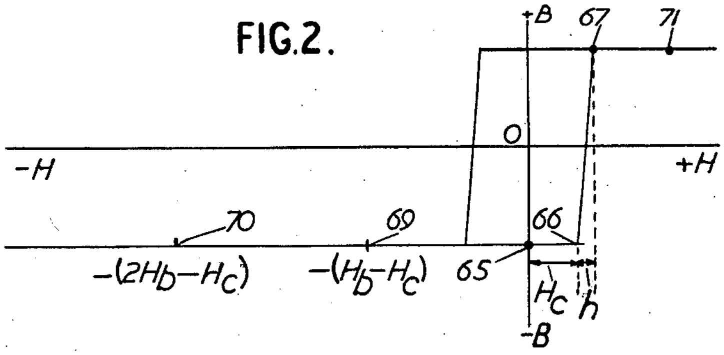
FIG. 2 shows a hysteresis curve used in the explanation of the operation of FIG. 1.

In FIG. 2, the points 69 and 70 represent the biassed condition of cores 1 and 2, when no signal wave or reading pulse is present, and these points are at distances of $(H_b-H_c)$ and $(2H_b-H_c)$ to the left of the axis of ordinates. The biassed conditions of the other cores will be represented by other points (not shown) further to the left. For example, from Table I it will be seen that the bias of the core No. 10 will be repersented by a point distant $(7H_b-H_c)$ from the axis of ordinates.

The reading pulses supplied by the source 56 should have an amplitude which will produce a magnetic field equal to $H_b$, and it will be seen that if, for example, the signal wave amplitude has a value such that the condition of the core No. 2 is represented by a point between points 66 and 69 (FIG. 2) when the signal wave is present, the condition of the core will be switched by a reading pulse to some point 71 on the upper branch of the hysteresis curve, and a sharp change of flux will be produced, so that output digit pulses will be produced in the two digit windings on core No. 2 as indicated in Table I. If the signal wave amplitude is less than the last mentioned value, i.e., an amplitude such that the condition of Core No. 2 is represented by a point to the left of that part of the hysteresis curve between points 66 and 99, the reading pulse will be unable to carry the condition of the core to a point on the upper branch of the curve and so no output digit pulses are produced. If however, the signal wave amplitude is greater than the last mentioned value, i.e., an amplitude such that the condition of Core No. 2 is represented by a point to the right of that part of the hysteresis curve between points 67 and 99, the condition of the core will already be on the upper branch of the curve, so that the reading pulse again cannot produce a change of flux sufficient to generate any output digit pulses. It will be seen that output pulses can only be obtained from the particular core for which the combined bias and signal wave currents cause the core to assume a condition represented by a point between points 66 and 69 in FIG. 2.

It should be mentioned that if the signal wave amplitude is slightly less than that corresponding to the point 66 in FIG. 2, the signal amplitude may increase during the period between two reading pulses sufficiently to carry the condition of the core beyond the point 66, so that it would seem that the core would be switched at some unwanted time without the help of a reading pulse. Actually some increase in flux in the core may occur in this case, but the increase in amplitude of the signal wave is so slow in comparison with the change produced by a reading pulse, that the corresponding output pulses are of negligible amplitude and would be eliminated by the limiters 58 to 62 (FIG. 1).

When the condition of the core has been switched by the reading pulse to a point on the upper branch of the curve, it is necessary to ensure that when the reading pulse disappears, the core shall be restored to a condition represented by a point on the lower branch. As explained in the parent specification this is done by preceding or following each reading pulse by a negative resetting pulse of amplitude exceeding that which will produce a field equal to $(2H_c+h)$. The corresponding negative pulses generated on resetting in the digit windings of the core, which are not wanted, are eliminated by the limiters 58 to 62 (FIG. 1).

As explained in the parent specification, the small field $h$ shown in FIG. 2 produces some degree of uncertainty at the boundaries of the quantising steps, but the effect of this uncertainty can be made unimportant by choosing $H_b$ large compared with $h$, and by using the cyclic permutation code.

The arrangement illustrated in FIG. 1 is designed for the case in which the signal wave is always of one polarity (e.g. positive) and provides for zero and 31 positive levels. It can however be easily modified for dealing with both positive and negative levels for a signal wave balanced to ground. For this purpose, for example, 31 additional cores may be provided, equipped with windings in the same way and with the same number of turns, as the respective cores 1 to 31 in FIG. 1 but with the following modifications:

(1) the bias windings 51 are wound "straight" instead of "reverse," the auxiliary bias windings however being also wound "straight."

(2) there will now be six digit conductors connected to six limiters, with windings on certain cores according to a six-digit code.

Corresponding windings of the additional cores are connected in series with the cores 1 to 31 of FIG. 1. In this case, however, it is necessary to have a core corresponding to zero level, which will for convenience be referred to as core No. 0, so that there will be a total of 63 cores. Core No. 0 should in theory have no bias winding 51, but in practice, false coding due to noise may be produced at zero level and it is therefore preferable to provide core No. 0 with a small bias which corresponds to a fraction of the quantum unit $H_b$ sufficient to prevent the noise from producing any effect on core No. 0.

The arrangement will be understood from FIG. 3, which shows the first of the positive level cores 1 and the first of the negative level cores 1A, and also the zero level core 0 arranged between them. Cores 2 to 31 not shown in FIG. 3 are arranged as in FIG. 1 together with elements 54, 55, 56, 58 to 64 and 69, as well as a sixth limiter not shown, connected between the sixth digit conductor and a tapping point on the delay network 63. Cores 2A to 31A are arranged in reverse order to cores 2 to 31, as indicated, and the windings of core 31A (not shown) will be connected to ground.

Cores 0 and 1A are provided with signal windings 52, reading pulse windings 53, and auxiliary windings 68 in the same way as for core No. 1. Single-turn bias windings 51 are provided on both of the cores 0 and 1A, wound "reverse" in the case of core 0 and "straight" in the case of core 1A. As already stated, the bias windings on all the cores 2A to 31A are wound "straight." In order to provide the required small bias field for the core 0, a resistor 72 is connected in series with the bias winding 51 and a second resistor 73 is connected to shunt the winding 51 and resistor 72 in series. By suitable choice of the values of the resistors 72 and 73, the bias current which flows through the winding 51 on core 0 can be adjusted to produce the desired fraction of the unit quantum magnetic field $H_b$.

In this case the six-digit cyclic permutation code can be arranged (in a manner similar to that shown in Table I for five digits), for signal levels increasing from level −32 to level +31, where level −32 corresponds to no digit pulses and has therefore no corresponding core. In this case core No. 1 needs one digit winding 57 in series with digit conductor V, core No. 0 requires two digit windings in series with conductors V and V1, and core No. 1A requires three digit windings in series with conductors I, V and V1, as shown.

It may be mentioned that the winding 51 on core No. 0 could be wound "straight" if desired, or if the noise interference is negligible it could be omitted, together with resistors 72 and 73.

FIG. 4 shows an example of a decoder adapted to operate with the coder shown in FIG. 1 and arranged to introduce the necessary amplitude expansion. There are 31 magnetic cores of which only eight are shown, namely Nos. 1, 5, 6, 14, 15, 23, 24 and 31.

It will be assumed that the incoming digit pulses arrive in sequence on conductor 74, and are unidirectional. Conductor 74 is connected to a converting device 75 which includes a delay line distributor, and also arrangements for delivering either a positive or a negative pulse to each of the five digit conductors designated I to V. The arrangement is such that when any code combination shown in Table I indicates the presence of a given digit pulse, the device 75 delivers a positive current pulse of amplitude C to the corresponding digit conductor, and when the combination indicates the absence of a digit pulse, the device 75 delivers a negative current pulse of amplitude C to the corresponding digit conductor. Thus, for example, in the case of core No. 24 in Table I, the pulses delivered to conductors I to V by the device 75 will be −C, −C, +C, −C, +C respectively.

Each of the 31 cores in FIG. 4 is provided with five digit windings 76 to 80, all such windings having the same number of turns; for example, each winding could have one turn. They are, however, wound "straight" or "reverse" according to the code set out in Table I; thus in the case of core 24 in FIG. 4, the digits 1 to 5 windings are wound respectively reverse, reverse, straight, reverse, straight. The windings corresponding to the same digit on all the cores are connected in series with the corresponding one of the digit conductors I to V between the device 75 and ground. As in FIG. 1, some of the connections of the digit conductors are shown broken to indicate that there are other digit windings or cores not shown.

Each core is also provided with a bias winding 81, all bias windings have the same number of turns (for example, 1 turn) and being wound "reverse." These windings are all connected in series to a bias source 82 having its negative terminal connected to ground. The arrangement should be such that the bias current flowing through all the bias windings is 4C, for a reason which will be explained later.

Each of the cores also has an output winding 83 wound "straight." The output winding on each core has the same number of turns as the bias winding on the core of the same number as given in Table I. The output windings are connected in series in four separate groups comprising respectively the windings on cores 1 to 5; cores 6 to 14; cores 15 to 23; and cores 24 to 31. By reference to Table I, it will be seen that these groups of cores are those in which the number of turns of the signal windings 52 of the coder (FIG. 1) is 32, 16, 4 and 1 respectively.

The groups of output windings in FIG. 4 are connected to a weighting network which comprises a shunt resistor 84 connected to ground, and four series resistors 85 to 88 connected respectively to terminals 89 to 92. An output terminal 93 is connected to the junction point of the resistor 84 and resistors 85 to 88 through a rectifier 94.

The four groups of output windings are connected respectively to terminals 89 to 92 as shown. The rectifier 94 is directed so that it will pass positive pulses to the output terminal 93 but will stop negative pulses.

If R is the value of the resistor 85, then the values of resistors 86, 87 and 88 should be respectively R/2, R/8 and R/32. It will be assumed that each of these resistors includes the resistance of the output windings to which it is connected.

The current amplitude C of each digit pulse supplied to one of the five digit conductors by the device 75 should be so chosen that it produces a flux $H_b$ in any core, where $H_b$ is greater than $2H_c$, (FIG. 2). Since the cores in FIG. 4 have no auxiliary bias winding, it will be clear that the source 82 which supplies a bias current of 4C to the bias windings 81 will produce a biassing flux equal to $4H_b$ in each core and the core will thus be in a condition corresponding to a point on the lower branch of the hysteresis curve FIG. 2 distant $4H_b$ to the left of the axis of ordinates. It was explained above that the digit windings are wound on each core "straight" or "reverse" according to the code combination of the corresponding level and that the digit pulses are supplied to the five digit conductors I to V positively or negatively according to the code combination. In the case of the core for which the digit windings are arranged according to the same code combination as the digit pulses, each of the five windings will produce a positive flux $H_b$ in the core, so that the total flux is $+5H_b$. This can be seen, for example, from the core No. 24 whose digit winding are wound reverse, reverse, straight, reverse, straight. The code combination of pulses for level 24 is $$- - + - +$$

so all the digit pulses combine to produce a positive flux in core No. 24. However, this is true for no other core; in every other case at least one of the windings will be wound in the wrong direction to produce a positive flux, so for every other core the total flux will be less than $+5H_b$. It follows that the flux produced by the digit pulses only in core No. 24 exceeds by $H_b$ the bias flux, so that the condition of this core is switched to a point on the upper branch of the hysteresis curve, and an output pulse is produced in the corresponding output winding.

It will be understood from this explanation that an output pulse is only obtained from the particular core having the combination of windings which corresponds with the code combination of the incoming digit pulses.

The amplitude of the output current pulse will be proportional to the number of turns of the output winding, which as already explained, is the same as that of the corresponding bias winding of the coder (FIG. 1). Thus taking the first five cores in FIG. 4, the output pulses will have current amplitudes proportional to the first five signal amplitude levels. However, as explained with respect to FIG. 1, for cores 6 to 14 the quantising step is doubled and so for these cores in FIG. 4 the equivalent amplitude of the output pulses must be doubled.

Similarly the current amplitude of the output pulses from cores 15 to 23 must be multiplied by 8, and that of the output pulses from cores 24 to 31 by 32. Thus multiplication is effected by the weighting network, since the values of the resistors 85 to 88 are inversely proportional to the numbers 1, 2, 8 and 32 respectively. It can easily be shown that with this arrangement, the proper weighting is obtained irrespective of the value of the resistor 84. The voltage across the resistor 84 is thus proportional to the original signal amplitude corresponding to each combination of digit pulses.

The rectifier 94 is provided to eliminate the unwanted negative output pulses which are produced by the resetting of the cores after they have been switched in accordance with the code combinations.

It will be evident that in response to each combination of code pulses there will be produced an output pulse at terminal 93 representing a corresponding sample of the signal wave. By passing the output pulses through a low-pass filter (not shown) the signal wave may be reproduced according to conventional practice.

Figure 5:
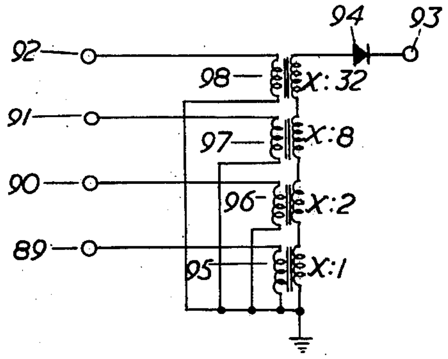
FIG. 5 shows a modification of part of FIG 4.

FIG. 5 shows an alternative form of the weighting network used in FIG. 4. It comprises four transformers 95 to 98 whose primary windings are connected respectively in series between terminals 89 and 92 and ground, and whose secondary windings are all connected in series between ground and rectifier 94, which is connected to terminal 93 as in FIG. 4.

The transformers 95 to 98 have step-up ratios proportional respectively to the numbers 1, 2, 8 and 32, whereby the amplitudes of the output pulses from the four groups of cores are multiplied according to those numbers.

It will be evident that the decoder shown in FIG. 4 can be modified to deal with both positive and negative levels by duplicating the cores or the lines described with reference to FIGS. 1 and 3 and by providing two weighting networks, one for the positive levels and the other for the negative levels. The second group of cores will have the bias windings wound "straight" instead of "reverse"; and there will, of course, be six digit windings on each core instead of five, and the bias current will be adjusted to 5C instead of 4C. The six digit windings on each core will be wound "straight" or "reverse" according to the corresponding code combination. The output windings for the second group of cores will be wound "reverse" instead of "straight."

It should also be pointed out that if no compression has been introduced during the coding process, the decoder shown in FIG. 4 can be modified so that it does not introduce any expansion. The modification consists in omitting the weighting network comprising resistors 84 to 88, and connecting the output windings 83 of all the cores in series between ground and the rectifier 94. The output windings on the respective cores are given numbers of turns increasing from 1 to 31 (or some constant multiple of such numbers), so that the numbers of turns of the output winding on core No. *m* is *a.m.*, where *a* is 1 or some other integer.

According to another feature of the invention the cores may be equipped with two sets of digit windings in such manner that one form of the binary code may be translated into another form, and when the translated form is the ordinary binary code, a simple weighting network can be added for decoding, if desired.

Figure 6:
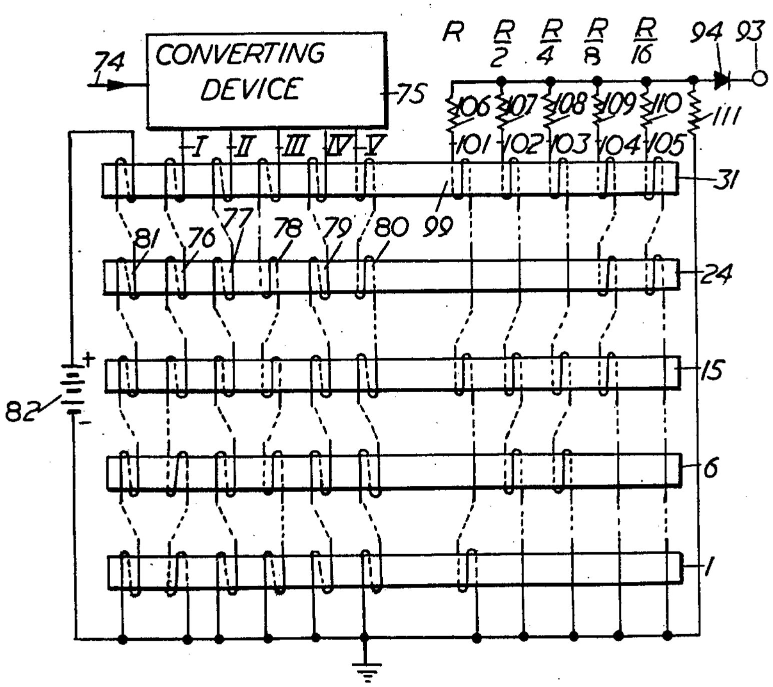
FIG. 6 shows a example of a code translator circuit which may be adapted for decoding.

Such an arrangement is shown in FIG. 6 for a five-digit code. In this figure only five of the 31 cores are shown, namely Nos. 1, 6, 15, 24 and 31. All the cores are provided with bias windings 81 and input digit windings 76 to 80 for the cyclic permutation code in the same way as in FIG. 4, together with elements 74, 75 and 82. The cores are provided with output digit windings 99, all wound "straight," and with the same number of turns, connected in series with five output digit conductors 101 to 105. The output digit windings 99 are distributed on the cores in accordance with the translated form of the code; that is, there is a winding on the core No. *m* for each output digit conductor which should produce a digit pulse according to the code combination for level *m.* In FIG. 6 the output digit windings have been arranged according to the ordinary binary code, but it will be obvious that they could be arranged for any form of the code.

In order to convert the arrangement into a decoder it is only necessary to connect the output digit conductors 101 to 105 to a weighting network similar to that shown in FIG. 4 comprising resistors 106 to 110 having resistances R, R/2, R/4, R/8 and R/16, the junction point of these resistors being connected to ground through a resistor 111 and to the output terminal 93 through the rectifier 94.

When the arrangement is not used for decoding, separate rectifiers (not shown) may be connected respectively to the digit conductors 101 to 105 to eliminate the unwanted negative pulses produced by the resulting of the cores.

Although FIG. 6 shows an arrangement for translating one five-digit code into another five-digit code, it can clearly be adapted for translating codes of any number of digits by providing the appropriate number of digit windings arranged according to the patterns of the codes concerned. It should be noted, also, that a binary code of any number of digits can be translated into a code of the error-detecting type having a larger number of digits, in which each code combination has the same number of digit pulses; or vice-versa. It is only necessary to provide the proper number of input and output digit conductors, and to provide the cores with input and output digit windings arranged according to the patterns of the two codes concerned.

It should perhaps be pointed out that in the arrangements illustrated in FIGS. 4 and 6, for codes of *d* digits, the current supplied to the bias windings 81 from the source 82 should be (*d*—1)C, where C is the current amplitude of the digit pulses supplied to the digit windings 76 to 80.

In the case of the embodiments which have been described above, it is assumed that the upper and lower portions of the hysteresis curve (FIG. 2) are parallel to the H-axis. In practice this condition is not quite fulfilled, and it will be seen that in the case of FIG. 1, for example, the reading pulse supplied to the windings 53 will in fact cause a change in flux in all of the cores which are not switched, which change is small compared with the change in the core which is switched. There are, however, always 15 unswitched cores which have a digit winding in series with each digit conductor, so that the small unwanted flux change is multiplied by 15 and may produce a spurious digit pulse on any digit conductor, of amplitude comparable with that of a real digit pulse, so that it may be difficult to eliminate the spurious pulse by means of the corresponding one of the limiters 58 to 62. If such is the case, one remedy is to provide on each core, in series with each digit conductor, a digit winding (not shown) wound "reverse" wherever no digit winding is indicated in Table I. By this means the spurious digit pulses due to 15 of the unswitched cores are cancelled out by these due to the other 15 unswitched cores. The switched core then produces the wanted digit pulses in the manner already explained. It will be noted that a "reverse" digit winding on the switched core will have no effect because the corresponding digit pulse is negative and is eliminated by the corresponding one of the limiters 59 to 62.

In the case of the FIG. 6 arrangement, similar unwanted output pulses are liable to be produced on the five output conductors 101 to 105, but it can be shown that the effects cancel out in the case of the first four conductors 101 to 104. The fifth conductor however has an unbalanced distribution of output windings; that is, there is an output winding on each of the cores 16 to 31 and none on any of the cores 1 to 15. It can be further shown that the total unwanted pulse due to the windings on cores 16 to 31 is positive for levels 16 to 31, and negative for the other levels, and the pulses are all substantially of the same amplitude, irrespective of the level. The simplest way of eliminating the unwanted pulse is to provide a compensating transformer (not shown) having its primary winding connected in series with conductor 105 and its secondary winding connected between ground and the junction point of rectifier 94 and resistor 111. The transformation ratio and poling of the transformer are chosen so that the unwanted pulse is substantially cancelled out.

Similar means can be adopted for the arrangement shown in FIG. 4, as will be evident to those skilled in the art. It will be clear also that various other methods of dealing with unwanted pulses due to the slope of the upper and lower portions of the hysteresis curve are possible.

It should be mentioned that while the cores are shown in the figures as straight rods for clearness, in practice they will preferably be of toroidal form; or alternatively, the windings may be threaded through holes in a ferrite block, as explained in the parent specification.

Suitable ferrite material for the toroidal cores or for the ferrite block has the following composition by weight:

| | Percent |
|---|---|
| $Fe_2O_3$ | 67.3 |
| MnO | 22.6 |
| MgO | 4.9 |
| ZnO | 5.2 |

Toroidal cores could also be made from permalloy material having the following composition by weight:

| | Percent |
|---|---|
| Nickel | 64.7 |
| Iron | 34.8 |
| Maganese | 0.5 |

What I claim is:

1. An electric pulse signal converting arrangement for converting an input pulse signal representing the instantaneous value of a signal wave in one form into an output pulse signal representing the input pulse signal in another form comprising:

A plurality of magnetic two-condition trigger devices each representative of a different quantized amplitude level of said signal waves, each of said devices including a core of magnetic material having a substantially rectangular loop B-H characteristic curve with relatively sharp discontinuities;

at least one input coil wound on each of said cores to couple said input signal thereto;

at least one output coil wound on each of said cores;

magnetic biasing means coupled to each of said cores;

said input and output coils having a given winding direction and a prescribed number of turns, said magnetic bias having a given value, and said input pulse signal having a predetermined polarity to cooperate in changing the condition of only that particular one of said trigger devices which represents the instantaneous value of said signal wave represented by said input signal and to cooperate in rendering the quantizing step between selected adjacent ones of said devices different; and means coupled to said output coils to derive said output signal from said particular one of said devices.

2. An arrangement according to claim 1, further including a readout coil wound on each of said cores to couple a readout signal thereto to trigger said particular one of said devices.

3. An electric pulse signal converting arrangement for converting an input pulse signal representing the instantaneous value of a signal wave in one form into an output pulse signal representing the input pulse signal in another form comprising:

a plurality of groups of magnetic two-condition trigger devices each representative of a different quantized amplitude level of said signal wave, each of said devices including a core of magnetic material having a substantially rectangular loop B-H characteristic curve with relatively sharp discontinuities;

at least one input coil wound on each of said cores to couple said input signal thereto;

at least one output coil wound on each of said cores;

magnetic biasing means coupled to each of said cores;

said input and output coils having a given winding direction and a prescribed number of turns, said magnetic bias having a given value, and said input pulse signal having a predetermined polarity to cooperate in changing the condition of only that particular one of said devices which represents the instantaneous value of said signal wave represented by said input pulse signal; and means coupled to said output coils to derive said output pulse signal from said particular one of said devices;

at least one of said input coils, said output coils, said biasing means, and said means to derive rendering the quantizing step between adjacent ones of said devices of any given one of said groups of said devices the same with a different quantizing step in each of said groups of said devices.

4. An arrangement according to claim 3, further including a reading coil wound on each of said cores to couple a reading pulse thereto to trigger said particular one of said devices.

5. An electric pulse converting arrangement for converting an input pulse having an amplitude representing the instantaneous value of a signal wave into a pulse code group according to a predetermined code comprising:

a plurality of groups of magnetic two-condition trigger devices each representative of a different quantized amplitude level of said signal wave, each of said devices including a core of magnetic material having a substantially rectangular loop B-H characteristic curve with relatively sharp discontinuities;

an input coil wound on each of said cores to couple said input pulse thereto;

at least one output coil wound on each of said cores in accordance with said predetermined code;

magnetic biasing means coupled to each of said cores;

said input and output coils having a given winding direction and a prescribed number of turns, said magnetic bias having a given value, and said input pulse having a predetermined polarity to cooperate in changing the condition of only that particular one of said devices which represents the instantaneous value of said signal wave representative by said input pulse;

said input coils having the same number of turns wound on each core of a given group of said devices but a different number of turns in different groups of said devices; and means coupled to said output coils to derive said code group from said particular one of said devices.

6. An arrangement according to claim 5, wherein said biasing means includes a bias coil wound on each of said cores having a different number of turns on each core of each of said groups of said devices.

7. An arrangement according to claim 6, wherein said biasing means further includes an auxiliary coil wound on each of said cores to provide a magnetic flux in each of said cores substantially equal to the coercive force of said magnetic material.

8. An arrangement according to claim 5, further including a reading coil wound on each of said cores to couple a reading pulse thereto to trigger said particular one of said devices.

9. An electric pulse converting arrangement for converting a pulse code group according to a predetermined code representing the instantaneous value of a signal wave into an output pulse having an amplitude equal to said instantaneous value comprising:

a plurality of groups of magnetic two-condition trigger devices each representative of a different quantized amplitude level of said signal wave, each of said devices including a core of magnetic material having a substantially rectangular loop B-H characteristic curve with relatively sharp discontinuities;

a plurality of input coils wound on each of said cores to couple the digit pulses of said code group thereto;

one output coil wound on each of said cores;

magnetic biasing means coupled to each of said cores;

said input coils on each of said cores having a direction of winding to cause only that particular core to change condition which corresponds to the quantized amplitude level represented by said code group;

means to connect said output coils in series according to said groups of said devices, the number of turns of said output coils on the cores of each of said groups being different; and means coupled to said means to connect to derive said output pulse.

10. An arrangement according to claim 9, wherein said means to derive includes a weighting network.

References Cited in the file of this patent

UNITED STATES PATENTS

| | | |
|---|---|---|
| 2,696,347 | Lo | Dec. 7, 1954 |
| 2,733,860 | Rajchman | Feb. 7, 1956 |
| 2,864,555 | Spencer | Dec. 16, 1958 |
| 2,954,550 | Starr | Sept. 27, 1960 |
| 2,962,704 | Busen | Nov. 29, 1960 |